(12) United States Patent
Katrinis et al.

(10) Patent No.: US 10,419,395 B2
(45) Date of Patent: Sep. 17, 2019

(54) ROUTING PACKETS IN A DATA CENTER NETWORK

(71) Applicant: INTERNATIONAL BUSINESS MACHINES CORPORATION, Armonk, NY (US)

(72) Inventors: Konstantin Katrinis, Dublin (IE); Spyros Kotoulas, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 14/921,703

(22) Filed: Oct. 23, 2015

(65) Prior Publication Data

US 2017/0118109 A1  Apr. 27, 2017

(51) Int. Cl.
*H04L 29/06* (2006.01)
*H04L 29/12* (2006.01)
*H04L 29/08* (2006.01)

(52) U.S. Cl.
CPC ........ *H04L 61/6022* (2013.01); *H04L 61/103* (2013.01); *H04L 67/00* (2013.01)

(58) Field of Classification Search
CPC .................................................... H04L 45/38
USPC ........................................................ 709/219
See application file for complete search history.

(56) References Cited

U.S. PATENT DOCUMENTS

| 7,680,779 | B2 | 3/2010 | Chaves | |
|---|---|---|---|---|
| 2006/0029104 | A1* | 2/2006 | Jungck | H04L 29/12066 370/498 |
| 2009/0006531 | A1 | 1/2009 | Gillum et al. | |
| 2011/0299537 | A1* | 12/2011 | Saraiya | H04L 61/2596 370/392 |
| 2012/0198045 | A1 | 8/2012 | Sakata et al. | |
| 2013/0212148 | A1 | 8/2013 | Kopen et al. | |

(Continued)

FOREIGN PATENT DOCUMENTS

| EP | 1061711 | 12/2000 |
|---|---|---|
| WO | 2014118526 | 8/2014 |
| WO | 2015023537 | 2/2015 |

OTHER PUBLICATIONS

US 8,230,065 B2, 07/2012, Farber et al. (withdrawn)

(Continued)

*Primary Examiner* — Vivek Srivastava
*Assistant Examiner* — Sibte H Bukhari
(74) *Attorney, Agent, or Firm* — F. Chau & Associates, LLC

(57) ABSTRACT

Accessing data stored on a remote server includes determining a first address of a first server where a block of data identified by a key has been moved from a second server to the first server, the second server having a second address. A first entry of a switch flow table of a datacenter network is updated to indicate that received packets with a destination address including the second address are to be overwritten with the first address. The data center network includes a plurality of physical network switches. A second entry in the switch flow table may be configured to forward packets with the first address to a first port associated with the first server and a first set of the switches. If the second entry is not already present in the table, the second entry may be inserted into the switch flow table.

18 Claims, 4 Drawing Sheets

(56) References Cited

U.S. PATENT DOCUMENTS

2013/0290249 A1* 10/2013 Merriman ............. G06F 16/273
707/610
2015/0244617 A1* 8/2015 Nakil .................. G06F 9/45558
709/224

OTHER PUBLICATIONS

Authors et al: Disclosed Anonymously, "A Method of Network-Assisted Lookup for Distributed Applications on Server Clusters", An IP.com Prior Art Database Technical Disclosure, IP.com No. 000224380, IP.com Electronic Publication: Dec. 17, 2012, pp. 1-5.
Filipe Araujo et al., "Minema Survey on Distributed Hash Tables", Based on a chapter of the PhD Thesis of Filipe Araujo, 2006 the University of Lisbon, pp. 1-21.
Introduction to VIPA, https//www.01.ibm.com/support/knowledgecenter/SSLTBW_2.1.0/com.ibm.zos.v2r1.halz002/vipa_intro.htmj, retrieved on Oct. 21, 2015.

\* cited by examiner

Static Location Lookup Table

| Key | IP Address |
|---|---|
| $K_1$ | $Addr_1$ |
| $K_2$ | $Addr_2$ |
| ... | ... |
| $K_x$ | $Addr_x$ |
| ... | ... |

FIG. 3

Switch Flow Table

| Match Rule | Action |
|---|---|
| ... | ... |
| MAC =-= $MAC_x$ && IPAddr == $Addr_x$ && Inport = 1 | REWRITE Dest MAC ($MAC_y$), Dest IPAddr ($IPAddr_y$) |
| ... | ... |
| MAC =-= $MAC_y$ && IPAddr == $Addr_y$ && Inport = 1 | FORWARD to port 2 |
| ... | ... |

FIG. 4

ROUTING PACKETS IN A DATA CENTER NETWORK

FIELD OF INVENTION

The present invention relates to a method, system and computer readable medium for implementing dynamic data management using packet routing manipulation in a data center network and more specifically using a routing state to route data retrieval requests to servers containing the requested data blocks and updating rules for routing a packet when a desired data block is moved.

BACKGROUND

Servers in a data center remotely store data. These servers may come under extreme load, become disabled or are otherwise inaccessible. The data on these server may then be redistributed. However, client applications require continued access to data, based on a fixed address. Thus, a transparent means for a client application to retrieve their data from a server is desirable.

SUMMARY

According to an exemplary embodiment of the invention, a method of managing access to data stored on a remote server includes determining a first address of a first server where a block of data identified by a key has been moved from a second server to the first server, the second server having a second address. A first entry of a switch flow table of a datacenter network is updated to indicate that received packets with a destination address including the second address are to be overwritten with the first address. The data center network includes a plurality of physical network switches.

According to an exemplary embodiment of the invention, an apparatus for managing access to data stored on a remote server includes a memory storing a computer program and a processor configured to execute the computer program. The computer program determines a first address of a first server where a block of data identified by a key has been moved from a second server to the first server. The second server has a second address. A first entry of a switch flow table of a datacenter network is updated to specify that received packets with a destination address including the second address are to be overwritten with the second address. The data center network includes a plurality of physical network switches.

According to an exemplary embodiment of the invention, a computer program product for managing access to data stored on a remote server is provided. The computer program product comprises a computer readable storage medium having program code embodied therewith. The program code executable by a processor performs method steps including instructions for determining a first address of a first server where a block of data identified by a key has been moved from a second server to the first server. The second server has a second address. A first entry of a switch flow table of a datacenter network is updated to specify that received packets with a destination address comprising the second address are to be overwritten with the second address. The data center network includes a plurality of physical network switches.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention.

FIG. 3 is a location lookup table of an exemplary embodiment of the invention.

FIG. 4 is a switch flow table of an exemplary embodiment of the invention.

DETAILED DESCRIPTION

Figure 1:
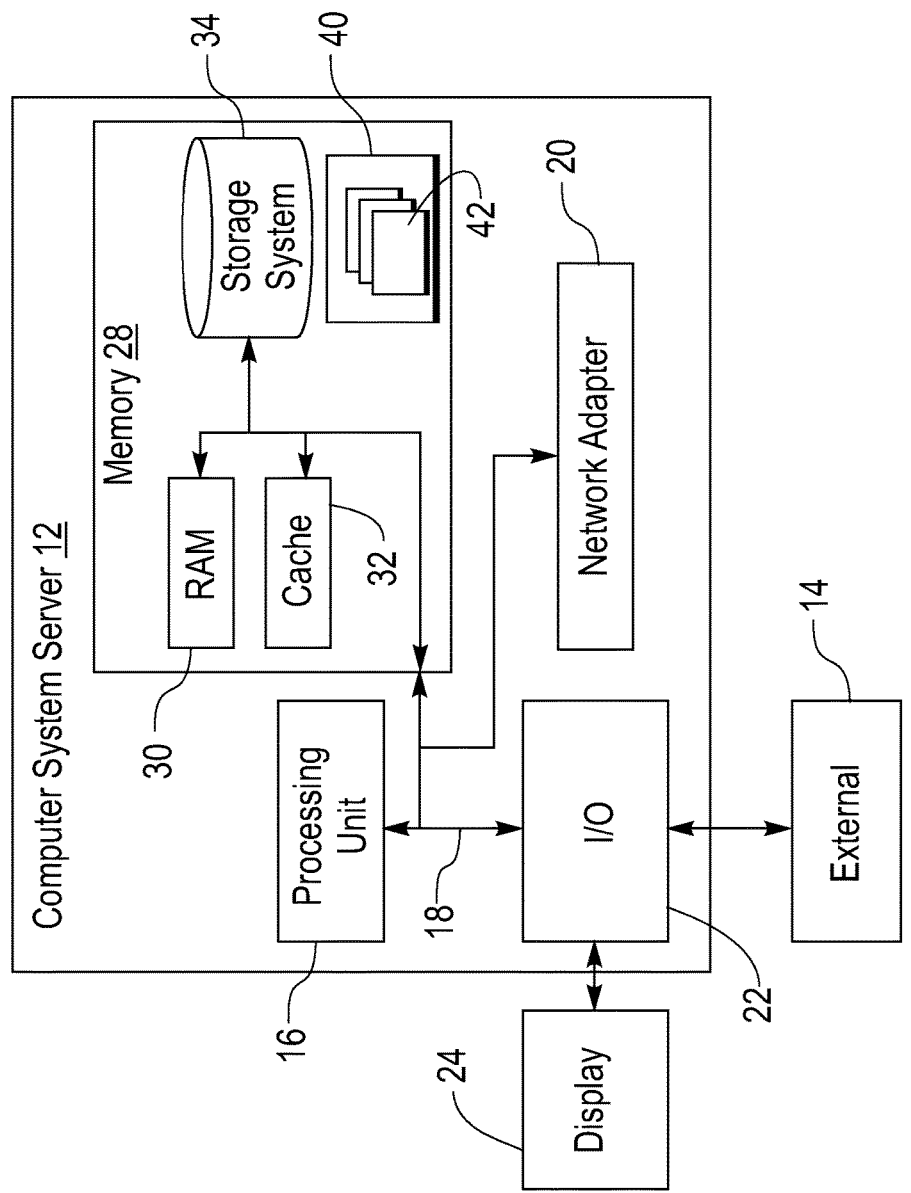
FIG. 1 is a schematic block diagram block diagram illustrating a computer system.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

FIG. 1 illustrates an exemplary computer system/server 12, which is applicable to implementing embodiments of the present invention. Computer system/server 12 is only illustrative and is not intended to suggest any limitation as to the scope of use or functionality of embodiments of the invention described herein.

As shown in FIG. 1, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 2:
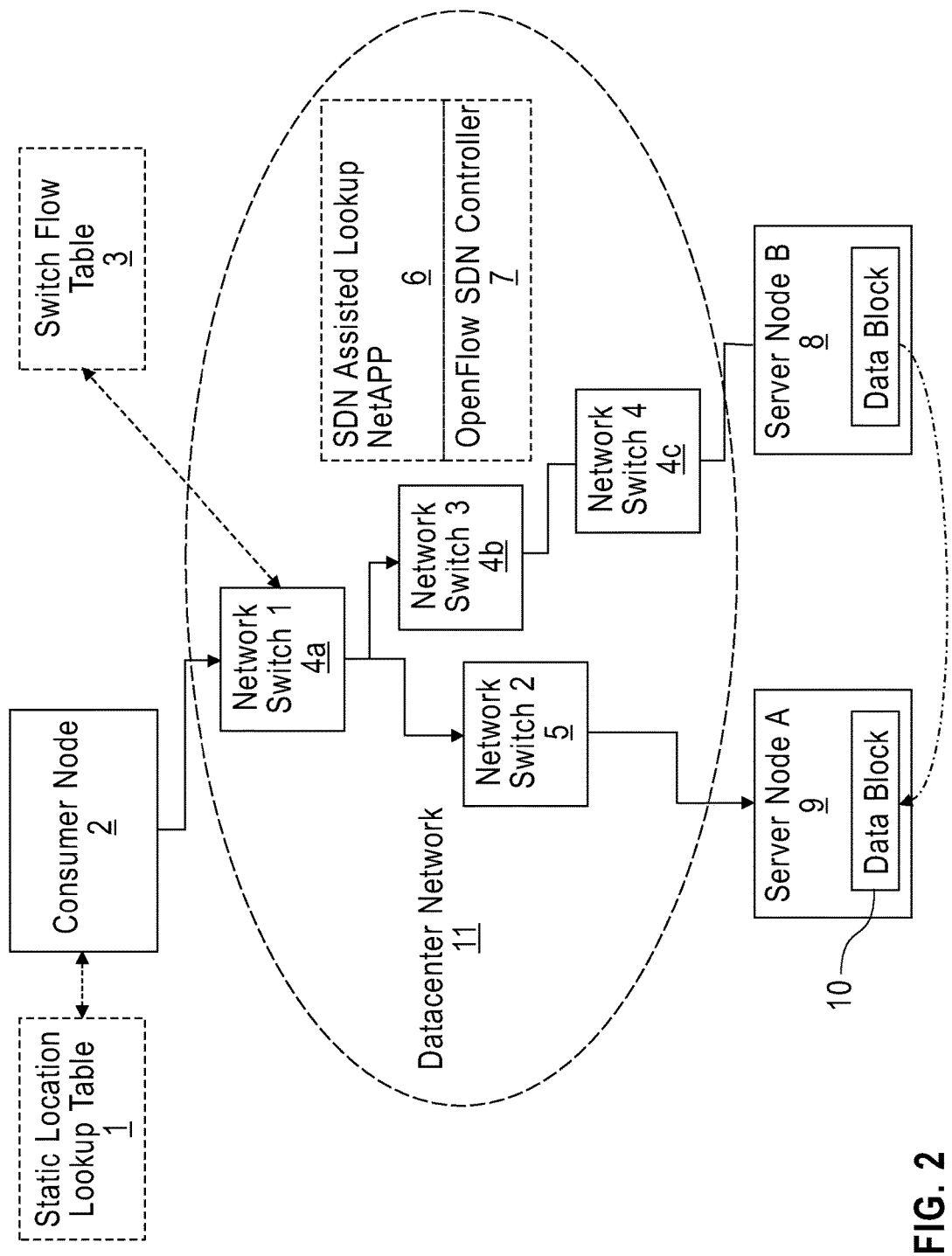
FIG. 2 is a schematic block diagram of an exemplary embodiment of the invention.

FIG. 2 illustrates a system according to an exemplary embodiment of the invention. The consumer node 2, the first server node 8 and/or the second server node 9 may be implemented by the computer system/server 12 illustrated in FIG. 2. Referring to FIG. 2, the system includes a lookup table 1, a consumer node 2, a datacenter network 4, a switch flow table 3, a first server node (e.g., Server Node A) 9, and a second server node (e.g., Server Node B) 8. The data center network 11 includes a plurality of network switches 4a-4c and 5. While FIG. 2 illustrates the data center network 11 having an arrangement of four network switches, the invention is not limited thereto. For example, the arrangement of network switches may vary.

In one approach to retrieving a data block over the datacenter network 11, the consumer node 2 sends an initial request packet to a server node. The datacenter network 11 routes the initial request packet. The server node receives the initial request packet and transmits the requested data block to the consumer node 2. In this approach, situations may arise where the server node is performing poorly, because of an excessive amount of requests, a hardware failure, etc. Thus, an approach that reduces the impact of a poorly performing server node is desirable.

According to an exemplary embodiment of the invention, the data block stored on the second server node 8 is moved to the first server node 9, which is a node that is separate from the first server node 9. Apportioning the data block 10 between multiple servers may provide resiliency in situations where a server node is performing poorly. The datacenter network 11 is alerted (e.g., notified) that the requested data block has been transferred from the second server node 8 to the first server node 9 and creates rules to divert requests for packets from the second server node 8 to the first server node 9. In a manner similar to the above approach, the consumer node 2 sends an initial request packet to the second server node 8 to retrieve the data block 10 over the datacenter network 11 because it is unaware that the data block has been moved to the first server node 9.

In an exemplary embodiment, the header of the request packet in the initial request packet is rewritten to generate a new request packet, which facilitates re-routing of the request packet through the data center network 11. The first server node 9 receives the new request packet after the rewrite and transmits the requested data block 10 to the consumer node 2 over the datacenter network 11.

A request packet is a packet that requests a given block of data from a remote server having a given address, where that block of data 10 is identified by a given key or key range. When multiple blocks of data are stored on one or more remote servers, a plurality of keys or key ranges are maintained. FIG. 2 is an example of the lookup table 1 being used to store those keys and an address of a server for each key in which a data block associated with the corresponding key is stored. The lookup table 3 may be static or dynamic. In addition, multiple addresses may refer to a single server. The lookup table 1 may represent a many-to-many relationship. In an exemplary embodiment, the consumer node 2 includes an application to request the data block represented by a first key $K_1$. The consumer node 2 accesses the lookup table 1 using the first key $K_1$. The lookup table 1 may be included in the consumer node 2 or the lookup table 1 may be stored externally to the consumer node 2. The lookup table 1 includes entries for matching a plurality of keys $K_x$ to the respective internet protocol IP address of the server in which the requested data block 10 is located. The lookup table 1 returns $Addr_1$ as the associated IP address for $K_1$. The consumer node 2 may use an address resolution protocol ARP to determine the MAC address associated with the server node having the IP address $Addr_1$. The consumer node 2 transmits the initial request packet to the first network switch (e.g., network switch 1) 4a.

One or more of the network switches 4a-4c and 5 may include the switch flow table 3. An example of the switch flow table 3 is illustrated in FIG. 3. The switch flow table 3 includes entries for matching a series of rules to actions. The first network switch 4a forwards the initial request packet to the second network switch 4b and so on until the initial request packet arrives at the designated server node in accordance with the rules on the switch flow table 3. The server node retrieves the desired data block based on the first key $K_1$ included in the initial request packet and transmits the desired data block back to the consumer node 2.

Figure 5:
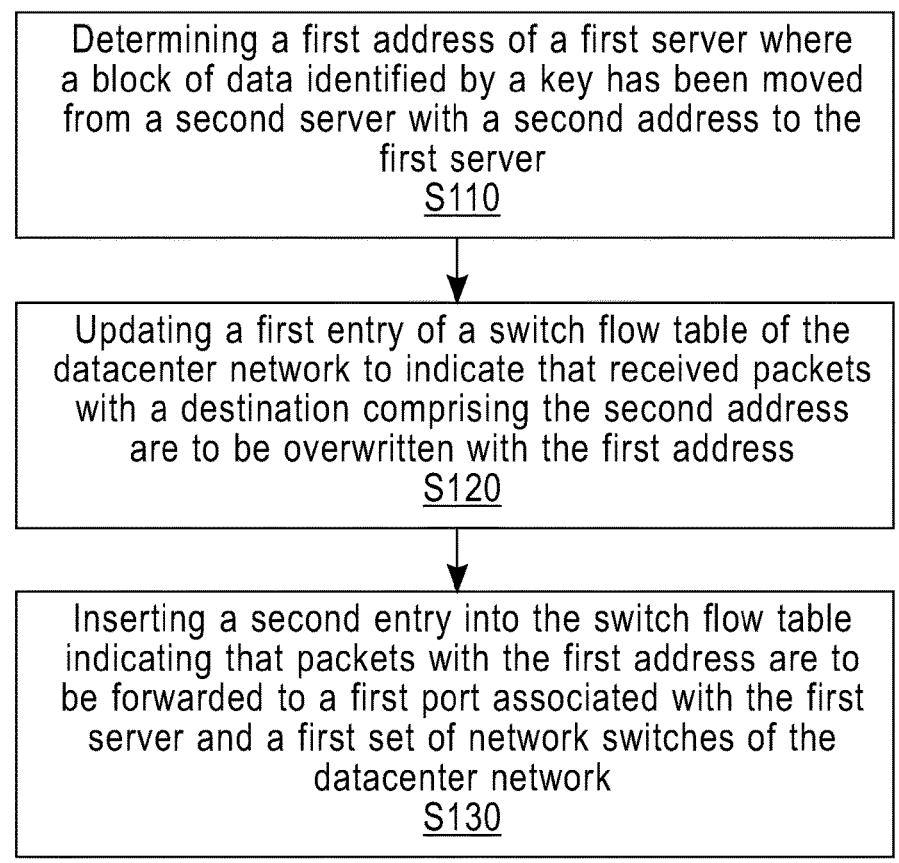
FIG. 5 is a flow chart illustrating the operation of an exemplary embodiment of the invention.

FIG. 5 illustrates a method of managing access to data stored on a remote server according to an exemplary embodiment of the invention.

According to the exemplary embodiment, the method includes: a network switch in the datacenter network 11 determining a first address of a first server (e.g., first server 9) where a block of data 10 identified by a key has been moved from a second server (e.g., second server 8) with a second address to the first server S110; and updating a first entry of a switch flow table 3 of the datacenter network 11 to indicate that received packets with a destination comprising the second address are to be overwritten with the first address S120. The method may further includes inserting a second entry into the switch flow table 3 indicating that packets with the first address are to be forwarded to a first port associated with the first server 9 and a first set of network switches of the datacenter network 11 S130. When the second entry is already present, the step of inserting the second entry is omitted.

In an embodiment, the first address of the first server 9 includes a first media access control (MAC) address and a first IP address. A user device (e.g., the consumer node 2) may determine the first IP address of the first server 9 by consulting the lookup table 1. The lookup table 1 links the key associated with a remotely stored data block 10 to the IP address of the remote server known to store the data block when the lookup table 1 was created.

For example, the consumer node 2 may include an application to request the data block represented by a first key $K_1$. The consumer node 2 accesses the lookup table 1. The lookup table 1 may be included in the consumer node 2 or the lookup table 1 may be stored external to the consumer node 2. As shown in FIG. 3, the lookup table 1 includes entries matching a plurality of keys $K_x$ to the respective IP address of the server in which the data block is located. The lookup table 1 returns $Addr_1$ as the associated IP address for $K_1$. The consumer node 2 may use an address resolution protocol ARP to determine the MAC address associated with server node B having the IP address $Addr_1$.

In an exemplary embodiment, the desired data block 10 is identified by a key. The key may be generated by the consumer node 2 or by a central management node located external to the consumer node 2. The key may be distributed to different user nodes connected to the data center network 11. In an exemplary embodiment, the key may be generated by a hash function based on the data block itself. In an embodiment, the hash function may be one of a MD5, SHA-1, SHA-512, SHA-3 or any other hash function.

In an exemplary embodiment, the request packet includes a destination IP address and a destination MAC address, an origin IP address and origin MAC address and a key identifying the desired data block. The destination IP address and the destination MAC address and the origin IP address and the origin MAC address may be included in the header of the request packet. The key may be included in the payload of the request packet. The payload of the packet may be encrypted using a symmetric key encryption algorithm or an asymmetric key encryption algorithm. An asymmetric encryption algorithm may include a diffie-hellman key exchange protocol, an RSA encryption algorithm or any similar asymmetric encryption algorithm. A symmetric encryption algorithm may include AES, RC4 or any similar symmetric encryption algorithm. In an exemplary embodiment, a custom protocol may be used where the header of the request packet includes the key.

As discussed above, a first entry of the switch flow table 3 of the datacenter network 4 is updated to indicate that received packets with a destination address comprising the second address are to be overwritten with the first address (e.g., see S120 of FIG. 5).

The data center network 11 includes a plurality of physical network switches 4a-4c and 5. The datacenter network 11 includes an OpenFlow software-defined networking (SDN) controller 7. The OpenFlow SDN controller 7 includes a SDN-Assisted Lookup NetApp 6. The SDN-Assisted Lookup NetApp 6 may be implemented as an application, plug-in or process integrated with the Open-Flow SDN controller 7. The OpenFlow SDN controller 7 and the SDN-Assisted Lookup NetApp 6 receive a message indicating that the data block 10 has been moved from the second server 8 to the first server 9. The SDN-Assisted Lookup NetApp 6 directs the OpenFlow SDN controller 7 to modify the switch flow table 3 as described above to direct the received packets away from the second server 8.

As discussed above, the method inserts the second entry into the switch flow table 4 indicating that packets with the first address are to be forwarded to the first port associated with the first server 9 and the first set of the switches (e.g., see S130 of FIG. 5). The SDN-Assisted Lookup NetApp 6 modifies the switch flow table 3 as described above to direct the received packets to the correct server. For example, the switch flow table 3 may be modified to direct the packet toward the first server 9 through one or more additional network switches.

In an exemplary embodiment, the updating of the first entry of the switch flow table 3 includes overwriting the first entry to specify that packets with a destination address having the second IP address and the second MAC address are to be overwritten with the first IP address and the first MAC address associated with the first server node 9. In an embodiment, prior to the updating, the first entry specifies that packets are to be forwarded to a second port associated with the second server 8.

The switch flow table 3 executes the rules according to a rule priority. To avoid the prior rule regarding the second server 8, the first entry is overwritten.

A data block 10, associated with the first key $K_1$, is transferred from the second server node 8 to the first server node 9. A modified software-defined networking SDN controller 7 is aware that the data block 10 has been moved and adds a rule to the switch flow table 3. The SDN controller 7 may be implemented in a network switch or in a separate device. The SDN controller 7 may be implemented in hardware, software or any combination of the two. The rule changes the destination of the request packet from the second server node 8 to the first server node 9 by changing the IP address in the request packet to a second IP address $addr_2$ and the MAC address in the request packet to a second MAC address $MAC_2$ of first server node 9.

Aspects of the embodiment may be implemented using software defined networking SDN. Decisions made regarding the control of the network and the routing of packets are made in the control plane. The decisions made in the control plane direct how packets are routed in the forwarding plane. The forwarding plane uses rules included in a switch flow table to determine how to route a packet. In an exemplary embodiment, a remote device may control a switch by sending updated rules to the switch. The switch updates the switch flow table and implements the new rule. The updated rules may be sent using any protocol that controls the forwarding plane of the network switch, such as OpenFlow, applied through any protocol that is able to dynamically control the network state.

The SDN-Assisted Lookup NetApp 6 and the SDN controller 7 receives a notification that the data block 10 is to be transmitted from the second server node 8 to the first server node 9. In an exemplary embodiment, the first server 9 transmits a notification to the SDN-Assisted Lookup NetApp 6 and the SDN controller 7 when the data block 10 is received or the second server node 8 may transmit a notification to the SDN-Assisted Lookup NetApp 6 and the SDN controller 7 when the data block 10 is transmitted. In an exemplary embodiment, the SDN-Assisted Lookup NetApp 6 and the SDN controller 7 may poll all the server nodes to determine a current location of the data block 10.

The server nodes may be polled when an event is triggered, such as the switch receiving the request packet, or based on a schedule.

In an exemplary embodiment, the first address includes a first media access control (MAC) address and a first IP address, and the second address includes a second MAC address and a second IP address. The second IP address is determined by associating a first key with the first IP address using the location lookup table 1. The second MAC address may be determined by using the address resolution protocol ARP to find the MAC address associated with the second IP address. The first IP address and MAC address may be provided by the switch flow table 3.

In an exemplary embodiment, a requesting server (e.g. a consumer node 2) accesses the location table using the key to lookup the second IP address. The requesting server may use an address resolution protocol to determine the second MAC from the second IP address. The requesting server outputs a packet including a destination address comprising the second IP address, the second MAC address and the key.

In an exemplary embodiment, the first network switch 4a determines whether a received packet has a destination address of the second server 8 and whether the packet is received from a port associated with the requesting server. The network switch routes the received packet to one of the first server 9 and the second server 8 based on a result of the determining steps. The first network switch 4a operates according to the rules set forth in the switch flow table 3. The first network switch 4a may forward the request packet to the first server node 9 or the second server node 8 based on the rules and the priority of the rules.

The consumer node 2 transmits the initial request packet to the first network switch 4a including a first key $K_1$, a first IP address $addr_1$ and a first MAC address $MAC_1$. The first network switch 4a is one switch of a plurality of switches included in the datacenter network 11. Each network switch accesses a switch flow table 3. The switch flow table 3 may be included in each network switch or the switch flow table 3 may be stored external to the network switch. The switch flow table 3 may be stored in a central location accessible by multiple network switches simultaneously. The switch flow table 3 includes entries for matching a series of rules to actions related to routing packets.

In an exemplary embodiment, the first network switch 4a determines the received packet has the destination address of the second server 8 when the destination address of the packet indicates the second IP address and the second MAC address. The first network switch 4a reads the destination MAC field and the destination IP address field of the request packet's header to determine the destination address.

In an exemplary embodiment, the first network switch 4a overwrites a destination IP address of the received packet with the first IP address and overwrites a destination MAC address of the received packet with the first MAC address.

In an exemplary embodiment, the first network switch 4a may route the received packet to the first server 9 when it is determined that the destination address corresponds to the second server 8 and the packet is received from a port associated with the consumer node 2. The first network switch 4a may route the received packet to the second server 8 when it is determined that the destination address corresponds to the second server 8 and the packet is received from a port not associated with the consumer node 2.

A datacenter network 11 may include a plurality of network switches. The plurality of network switches may route packets according to rules set in a switch flow table 3. The switch flow table 3 may be modified according to a changed location of a data block 10 or a change in the path to the data block 10. The first network switch 4a may forward the request packet to the second network switch 5 because the first network switch 4a is not physically connected to the first server node 9. The request packet may be routed between network switches until the request packet arrives at the designated first server node 9 in accordance with the rules on the switch flow table 3.

In an exemplary embodiment, the first server 9 retrieves the block of data 10 from storage of the retrieving server using the key located within the routed packet. The first server 9 sends the block of data 10 to the consumer node 2. The first server node 9 searches its storage for the data block 10 associated with the first key. The first server node 9 retrieves the desired data block 10 based on the first key $K_1$ included in the request packet and transmits the desired data block 10 back to the consumer node 2. The data block 10 is sent to the consumer node's 2 address. The first server node 9 determines the consumer node's 2 address by reading the origin IP address and MAC address in the request packet.

In an exemplary embodiment, an apparatus for managing access to data stored on a remote server includes a memory storing a computer program and a processor configured to execute the computer program.

The consumer node, server node and/or network switch may have resident thereon an operating system such as the Microsoft Windows® Operating System (OS), a MAC OS, or UNIX operating system. It will be appreciated that an embodiment may also be implemented on platforms and operating systems other than those mentioned. An embodiment may be written using JAVA, XML, C, and/or C++ language, or any other high-level, scripting or symbolic programming languages.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing access to data stored on a first server having a first address and a second server having a second address using a datacenter network comprising a plurality of physical network switches, the method comprising:

moving, by the second server, a block of data from the second server to the first server, wherein a key identifying the block of data is stored in an entry of a lookup table associated with the second address;

sending, by the second server, a message to a one of the physical network switches after the moving, the message indicating that the block of data was moved from the second server to the first server;

updating, by the datacenter network, a first rule of a switch flow table associated with the second address to indicate that received packets with a destination comprising the second address are to be overwritten with the first address, in response to receipt of the message and changing, by the datacenter network, a destination address of a received request packet to the first address by executing the first rule when the destination address of the received request packet is the second address, wherein the received request packet is generated by a requesting server accessing the lookup table via the key that identifies the block of data, wherein the updating causes the first rule to specify that packets received including the second address as a destination are to be forwarded to a first port associated with the first server and a first set of the network switches and prior to the updating, the first rule specifies that the packets received including the second address as a destination are to be forwarded to a second port associated with the second server and a second other set of the network switches.

2. The method of claim 1, wherein the block of data is moved upon determining that the second server is performing poorly.

3. The method of claim 1, wherein the first address comprises a first media access control (MAC) address and a first IP address, and the second address comprises a second MAC address and a second IP address.

4. The method of claim 3, wherein the updating comprises overwriting the first rule to specify that the received packets with a destination address comprising the second IP address and the second MAC address are to be overwritten with the first IP address and the first MAC address.

5. The method of claim 3, further comprising:
the requesting server accessing the lookup table using the key to lookup the second IP address;
the requesting server using an address resolution protocol to determine the second MAC from the second IP address; and
the requesting server outputting the request packet including a destination address comprising the second IP address, the second MAC address, and the key.

6. The method of claim 5, further comprising:
determining, by the datacenter network, whether the received request packet has a destination address of the second server;
determining, by the datacenter network, whether the received request packet is received from a port associated with the requesting server; and
routing, by the datacenter network, the received request packet to one of the first server and the second server based on a result of the determining steps.

7. The method of claim 6, wherein the received request packet is determined to have the destination address of the second server when the destination address of the received request packet indicates the second IP address and the second MAC address.

8. The method of claim 6, wherein the routing comprises:
routing, by the datacenter network, the received request packet to the first server when it is determined that the destination address corresponds to the second server and the request packet is received from a port associated with the requesting server; and
routing, by the datacenter network, the received request packet to the second server when it is determined that the destination address corresponds to the second server and the request packet is received from a port not associated with the requesting server.

9. The method of claim 8,
wherein the routing of the received request packet to the first server comprises:
referring to the second rule to route the received request packet to the first server through the first port.

10. The method of claim 9, wherein the changing comprises overwriting a destination IP address of the received request packet with the first IP address and overwriting a destination MAC address of the received request packet with the first MAC address.

11. The method of claim 9, further comprising:
retrieving, by the first server, the block of data from storage of the requesting server using the key located within the routed packet; and
sending, by the first server, the block of data to the requesting server.

12. An apparatus for managing access to data stored on a first server having a first address and a second server having a second address, the apparatus comprising:
a memory storing a computer program; and
a processor configured to execute the computer program, wherein the computer program is configured to:
move a block of data from the second server to the first server, wherein a key identifying the block of data is stored in an entry of a lookup table associated with the second address;
send a message from the second server to one of a plurality of physical network switches of a datacenter network after the move, the message indicating that the block of data was moved from the second server to the first server;
update a first rule of a switch flow table of a datacenter network associated with the second address to indicate that received packets with a destination comprising the second address are to be overwritten with the first address in response to receipt of the message,
change a destination address of a request packet received by the datacenter network to the first address by executing the first rule when the destination address of the received request packet is the second address, wherein the received request packet is generated by a requesting server accessing the lookup table via the key that identifies the block of data,
wherein the update, causes the first rule to specify that packets received including the second address as a destination are to be forwarded to a first port associated with the first server and a first set of the network switches and prior to the update, the first rule specifies that the packets received including the second address as a destination are to be forwarded to a second port associated with the second server and a second other set of the network switches.

13. The apparatus of claim 12, wherein the block of data is moved upon determining that the second server is performing poorly.

14. The apparatus of claim 12, wherein the computer program is an application that uses an OpenFlow® communications protocol to access a forwarding plane of the network switches.

15. The apparatus of claim 12, wherein the first address comprises a first media access control (MAC) address and a first IP address, and the second address comprises a second MAC address and a second IP address.

16. The apparatus of claim 12, wherein the update comprises overwriting the first rule to specify that packets with a destination address comprising the second IP address and the second MAC address are to be overwritten with the first IP address and the first MAC address.

17. A computer program product for managing access to data stored on a first server having a first address and a second server having a second address, the computer program product comprising a memory device having program code embodied therewith, the program code executable by a processor, to perform method steps comprising instructions for:

moving a block of data from the second server to the first server, wherein a key identifying the block of data is stored in an entry of a lookup table associated with the second address;

sending a message from the second server to one of a plurality of physical network switches of a datacenter network after the move, the message indicating that the block of data was moved from the second server to the first server;

updating a first rule of a switch flow table of a datacenter network associated with the second address to indicate that received packets with a destination comprising the second address are to be overwritten with the first address in response to receipt of the message; and changing a destination address of a request packet received by the datacenter network to the first address by executing the first rule when the destination address of the received request packet is the second address, wherein the received request packet is generated by a requesting server accessing the lookup table via the key that identifies the block of data, wherein the updating causes the first rule to specify that packets received including the second address as a destination are to be forwarded to a first port associated with the first server and a first set of the network switches and prior to the updating, the first rule specifies that the packets received including the second address as a destination are to be forwarded to a second port associated with the second server and a second other set of the network switches.

18. The computer program product of claim 17, wherein the block of data is moved upon determining that the second server is performing poorly.

* * * * *